US007161961B2

(12) United States Patent
Barker et al.

(10) Patent No.: US 7,161,961 B2
(45) Date of Patent: Jan. 9, 2007

(54) STM-1 TO STM-64 SDH/SONET FRAMER WITH DATA MULTIPLEXING FROM A SERIES OF CONFIGURABLE I/O PORTS

(75) Inventors: Kenneth James Barker, Holly Springs, NC (US); Rolf Clauberg, Gattikon (CH); Jean Louis Calvignac, Cary, NC (US); Andreas Guenther Herkersdorf, Langnau a. Albis (CH); Fabrice Jean Verplanken, La Gaude (FR); David John Webb, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 09/880,450

(22) Filed: Jun. 13, 2001

(65) Prior Publication Data

US 2003/0007513 A1   Jan. 9, 2003

(51) Int. Cl.
*H04J 3/00* (2006.01)
*H04J 3/02* (2006.01)
*H04L 12/56* (2006.01)

(52) U.S. Cl. .................. 370/476; 370/538; 370/543; 370/403

(58) Field of Classification Search ........ 370/400–402, 370/465–466, 535–542, 395.5
See application file for complete search history.

(56) References Cited

U.S. PATENT DOCUMENTS

| 6,298,038 B1 * | 10/2001 | Martin et al. ............... 370/535 |
| 6,522,671 B1 * | 2/2003 | Solheim et al. ............ 370/535 |
| 6,636,529 B1 * | 10/2003 | Goodman et al. .......... 370/466 |

(Continued)

FOREIGN PATENT DOCUMENTS

EP    1 083 692 A2    3/2001

(Continued)

OTHER PUBLICATIONS

PCT Search Report for PCT/EP 02/04838, filed Mar. 5, 2002.

(Continued)

*Primary Examiner*—Steven Nguyen
(74) *Attorney, Agent, or Firm*—Joscelyn G. Cockburn

(57) ABSTRACT

The present invention relates to a device for combining at least two data signals having an input data rate into a single data stream having an output data rate being higher than the input data rate for transmission on a shared medium or vice versa, particularly, to a single SDH/SONET framer capable of handling a large range of SDH/SONET frames from STM-i to STM-j with an aggregated total capacity corresponding to an STM-j frame where i and j are integers in the range from 1 to 64 or higher according to the STM-N definition of the SDH/SONET standards. More over, the present invention can also be extended to work with STS-1 as lowest range. STS-1 exists in SONET only not SDH and corresponds to a data rate of 51.5 Mb/s a third of the 156 Mb/s of STM-1. The device according to the present invention comprises at least two ports for receiving and/or sending said at least two data signals, a port scanning unit for extracting data from the data signals received by said ports and/or synthesizing data to be transmitted via the ports, respectively, whereby said port scanning unit is configured to extract data from ports providing data streams having at least two different input data rates and/or to synthesize data to be transmitted via the ports taking data streams having at least two different data rates.

8 Claims, 3 Drawing Sheets

U.S. PATENT DOCUMENTS 6,778,561 B1 * 8/2004 Jha .......................... 370/537
6,822,975 B1 * 11/2004 Antosik et al. ............. 370/538
6,839,352 B1 * 1/2005 Vogel ........................ 370/466

FOREIGN PATENT DOCUMENTS

WO    WO 96/08902    3/1996
WO    WO 98/26531    6/1998

OTHER PUBLICATIONS

Glock, S. et al, "Synchrone Multiplexeinrichtungen fur die untere Netzbene," Nachrichtentechnische Berichte, ANT, Nachrichtentechnick GMB. Backnang, Dem No. 9, Apr. 1, 1992, pp. 20-29.

Herkersdorf, A. et al, "A Scalable SDH/SONET Framer Architecture for DataCom and Telco Applications," Broadband Communications, 2000 Proceedings, 2000 International Zurich Seminar on Zurich Switzerland Feb. 15-17, 2000, pp. 191-198.

* cited by examiner

STM-1 TO STM-64 SDH/SONET FRAMER WITH DATA MULTIPLEXING FROM A SERIES OF CONFIGURABLE I/O PORTS

BACKGROUND OF THE INVENTION

1. Field of the Invention

The present invention relates to a device for combining at least two data signals having an input data rate into a single data stream having an output data rate being higher than the input data rate for transmission on a shared medium or vice versa. Particularly, the present invention relates to a single SDH/SONET framer capable of handling a large range of SDH/SONET frames from STM-i to STM-j with an aggregated total capacity corresponding to an STM-j frame where i and j are integers in the range from 1 to 64 or higher according to the STM-N definition of the SDH/SONET standards. More over, the present invention can also be extended to work with STS-1 as lowest range. STS-1 exists in SONET only not SDH and corresponds to a data rate of 51.84 Mb/s a third of the 156 Mb/s of STM-1.

2. Description of the Related Art

The American National Standards Institute has established a new basic standard for high-speed, multiplexed digital data transmission. This is the "synchronous optical network" standard, henceforth referred to as SONET. The SONET standard specifies optical interfaces, data rates, operation procedures and frame structures for multiplexed digital transmission via fiber optic networks.

The International Telecommunications Union (ITU) has adopted the interface principles of SONET and recommended a new global transmission standard for high-speed digital data transmission. This standard is the "synchronous digital hierarchy" (SDH).

For an account of the SDH standard on the "General Aspects of Digital Transmission Systems", reference is made to the ITU standards documents G.707 (Synchronous Digital Hierarchy Bit Rates), G.708 (Network Node Interface for the Synchronous Digital Hierarchy), G.709 (Synchronous Multiplexing Structure), G.782 (Types and General Characteristics of Synchronous Digital Hierarchy (SDH) Equipment), and G.783 (Characteristics of Synchronous Digital Hierarchy (SDH) Equipment Functional Blocks), all issued March 1993.

The SDH standard is designed to enable manufacturers to develop telecommunications equipment which: a) will be interchangeable in all telecommunication networks built around the world to its standard; and which b) is backwards compatible, i.e. can be used with data which is in the older telecommunications formats used in North America, Europe and Japan.

This is achieved by a hierarchy of so-called "Containers" (C) and "Virtual Containers" (VC), see FIG. 1. The containers, e.g. C-4, C-3, C-12, etc., are information structures designed to accommodate data traffic with specific transmission rates. The C-4 container carries traffic with a base rate of up to 139 264 kbit/s, C-3 carries either up to 44 736 or 34 368 kbit/s, etc. The containers are turned into virtual containers by adding "Path Overhead" information (POH) to it. By procedures defined as multiplexing, mapping, or aligning, data structures are generated which are constitutive to the SDH. These data structures are named "Administrative Unit Groups" (AUG) and "Synchronous Transport Module" (STM). The label of an STM is defined by the number of AUGs it carries: a STM-4 contains for example four AUGs. An AUG contains either one "Administration Unit" (AU) of type 4 or three AU-3. Referring to the simplest case, in turn one AU-4 contains one C-4 signal and one AU-3 carries one C-3 signal.

The SDH/SONET data frames, i.e., the STM-N signals, are 125 micro-seconds long. The amount of data transmitted in each frame depends on the hierarchy level N of the signal.

The higher hierarchical levels are transmitted at higher data rates than the basic STM-1 level of approximately 155 Mbit/s. (The exact transmission rate is defined as 155.52 Mbit/s. However here and in the following transmission rates are often denoted by their approximate values. This in particular due to the fact that the exact data transmission rates are distorted by overhead data traffic and idle cell stuffing.) The integer N indicates how many times faster the data is transmitted than in the STM-1 level.

For example STM-4 denotes a data transmission rate of 622 Mbit/s, whereby each data frame contains four times as many bytes as does a frame of STM-1. Currently, the highest defined SONET/SDH level is STM-256/STS-768 which has a data rate of 39.81312 Gb/s. Clearly, each part of the STM-N signal is broadcast in the same time as the corresponding part of an STM-1 signal, but contains N times as many bytes.

The STM-1 signal, as shown in FIG. 2, contains an information rectangle of 9 rows with 270 bytes/row corresponding to a SONET/SDH data rate of 155.52 Mbit/s. The first 9 bytes/row represent the "Section Overhead", henceforth SOH. The remaining 261 bytes/row are reserved for the VCs, which in FIG. 1 is a VC-4. The first column of a VC-4 container consists of the "Path Overhead" (POH). The rest is occupied by the payload (a C-4 signal). Several VCs can be concatenated to provide a single transmission channel with a corresponding bandwidth. For example, four VC-4 in a STM4 signal can be concatenated to form a single data channel with approximately 600 Mbit/s capacity: in this case the four VC are referred to in the standard terminology as VC-4-4c and the signal as STM-4c.

This flexibility of the SDH standard is partly due to the pointer concept. In SDH, the frames are synchronized, but the VCs within them are not locked to the frames. So the individual containers of the SDH signals do not have to be frame aligned or synchronized among each other. A "pointer" is provided in the Section Overhead which indicates the position of the above introduced POH, i.e. the start of a virtual container in the SDH frame. The POH can thus be flexibly positioned at any position in the frame.

The multiplexing of information into higher order SDH frames becomes simpler than in the old data standards, and an expensive synchronization buffer is not required in SDH.

Similarly, lower order signals can be extracted out of and inserted into the higher order SDH signals without the need to demultiplex the entire signal hierarchy. The pointers are stored in the fourth row of the Section Overhead.

The Section Overhead is further subdivided into: 1. The "Regenerator Section Overhead" or RSOH. This contains bytes of information which are used by repeater stations along the route traversed by the SONET/SDH Signal.

The Regenerator Section Overhead occupies rows 1–3 of the Section Overhead.

The "Multiplexer Section Overhead" or MSOH. This contains bytes of information used by the multiplexers along the SONET/SDH signal's route. The Multiplexer Section Overhead occupies rows 5–9 of the Section Overhead. These sections are assembled and dissembled at different stages during the transmission process. FIG. 2 also shows an exploded view of the MSOH.

In the SONET system, a base signal of 51.84 Mbit/s is used. It is called the Synchronous Transport Signal level 1, henceforth STS-1. This has an information rectangle of 9 rows with 90 bytes/row. The first three bytes/row are the section overhead and the remaining 87 bytes/row are the "Synchronous Payload Envelope", henceforth SPE.

Three of these SPEs fit exactly into one Virtual Container-4. Thus signals in the STS-1 signal format can be mapped into an STM-1 frame. Furthermore, frame-aligned STS-1 or STM-1 signals can be multiplexed into higher order STM-N frames.

In general, any lower data rate signal which is combined with other such signals into new data frames of higher rate is referred to as a "tributary" signal. For example in the previous paragraph, the three STS-1 signals which are combined into one STM-1 signal are tributary signals.

Digital Cross-Connect (DCC) functionality provides the possibility of rearranging the temporal (in case of a serial high-rate signal) or the spatial (in case of a demultiplexed high-rate signal) order of the low-rate signals or tributaries within the high-rate signal.

Add/Drop functionality allows to extract and/or replace one or more tributary signals from the high-rate signal. It is also known as Drop/Insert functionality.

From WO 98/26531 a digital cross connect and add/drop multiplexing device for SDH or SONET signals is known. In the device four modules for transmitting and four modules for receiving SDH/SONET data traffic are cast together into one chip die forming a STM-4 chip, since the four modules each output a STM-1 signal. Four of these STM-4 chips, operating in parallel, are able to process a STM-16 signal. Each of the four STM-4 chips is connected with four exterior interfaces to a multiplexer/demultiplexer unit. Each of these exterior interfaces is coordinated with one of the basic modules on the respective chip. The SONET/SDH signals transmitted on network lines are transferred out of and into the multiplexer/demultiplexer unit. Four interior interfaces of each STM-4 chip carry data signals extracted from, or to be inserted into the SONET/SDH frames. Depending on the interconnections of the interior interfaces either digital cross-connection or local add/drop functions are provided.

OBJECT OF THE INVENTION

Starting from this, the object of the present invention is to provide a method and a device for efficiently combining at least two data signals having an input data rate into a single data stream having an output data rate being higher than the input data rate for transmission on a shared medium or vice versa.

BRIEF SUMMARY OF THE INVENTION

The foregoing object is achieved by a method and a system as laid out in the independent claims. Further advantageous embodiments of the present invention are described in the sub claims and are taught in the following description.

According to the present invention a method and a device is provided for combining at least two data signals having an input data rate into a single data stream having an output data rate being higher than the input data rate for transmission on a shared medium or vice versa. The device according to the present invention comprises at least two ports for receiving and/or sending said at least two data signals, a port scanning unit for extracting data from the data signals received by said ports and/or synthesizing data to be transmitted via the ports, respectively, whereby said port scanning unit is configured to extract data from ports providing data streams having at least two different input data rates and/or to synthesize data to be transmitted via the ports taking data streams having at least two different data rates.

The features of the present invention will be described for the receive side of the device first. The device according to the present invention can advantageously be used as a SDH/SONET framer. As aforementioned according to the SDH/SONET standard data from a number of ports are multiplexed in the way that with each cycle of the system clock a given number of bytes m, corresponding to a fixed data path width m of the system and belonging to one specific port, are forwarded onto a data path where single logic units perform the SDH/SONET processing steps for these data.

These processing steps are frame byte alignment, frame descrambling, section overhead processing, pointer processing, path overhead processing, and payload handling. The device according to the present invention is thereby separating data and function in the way that, e.g., a single section overhead processing unit is processing data from one STM-N frame in one clock cycle, storing all intermediate results and status information in a memory block corresponding to this frame and in the next clock cycle processes data from a STM-J frame in the same way, whereby N and J represent SONET levels. A high flexibility is gained since the ports have different data rates, such as STM-1, STM-4, STM-16, STM-64 and STM-256 frames. At this, each port may have a different clock on its receive side (corresponding to its data rate) but that the m-byte wide data path bus is clocked with a single system clock.

For the transmit side of a device according to the present invention the same operations are done in reverse order and again by separating function and data by the use of a series of memory blocks.

Advantageously, any possible SDH/SONET payload, e.g., ATM cells, PPP (Point-to-Point Protocol) packets, Ethernet frames etc. may be handled by mapping into corresponding virtual containers and STM-N frames with virtual containers and frames switching possibly with each clock cycle, the frames will be scrambled and output at the corresponding ports. Frame byte alignment is not needed in this direction and the corresponding unit is bypassed.

A further advantage is that only a single device for such a large range of frames need to be provided. Moreover it may be integrated with a network processor or could operate under other conditions where complex configurations of SDH/SONET connections are likely. A network processor is usually designed to operate under many different configurations and in the wide-area network arena this also includes large configurations of SDH/SONET frames.

One preferred embodiment of the device according to the present invention is an STM-1 to STM-64 framer which handles frames from STM-1 (STS-3 in SONET notation) to STM-64 (STS-192 in SONET notation) with an aggregated total capacity corresponding to an STM-64 frame. Hence, the following configurations of frames can be handled:

1. 1×STM-64
2. 4×STM-16
3. 3×STM-16 plus
   a. 4×STM-4
   b. 3×STM-4 plus 4×STM-1
   c. 2×STM-4 plus 8×STM-1
   d. 1×STM-4 plus 12×STM-1
4. 2×STM-16 plus
   a. 8×STM-4
   b. . . .

5. 1×STM-16 plus
   a. 12×STM-4
   b. . . .
6. 16×STM-4
7. 15×STM-4 plus 4×STM-1
8. 14×STM-4 plus 8×STM-1
9. . . . . . . .
22. 1×STM-4 plus 60×STM-1

Within a frame all suitable configurations of virtual SDH containers are possible:
STM-64: 64 VC-4 or 16 VC-4-4c or 4 VC-4-16c or 1 VC-4-64c
STM-16: 16 VC-4 or 4 VC-4-4c or 1 VC-4-16c
STM-4: 4 VC-4 or 1 VC-4-4c
STM-1: 1 VC-4

The present invention solves the configurability and space problem by multiplexing the SDH/SONET data from frames with data rates lower than STM-64 onto a 9 byte wide data path clocked with STM-64 rate. The system control logic knows about the port configuration and data from which port is handled within which clock cycle. This can either be achieved by storing the port configuration in a central register bank and handling data accordingly or by augmenting the data by one additional byte which represents the encoded port number and using this port number as identification in all processing units. One byte is sufficient for the maximum of 64 ports to handle.

The device according to the present invention works with different memory blocks for each frame port or virtual container VC-4-xc depending on the function of the corresponding unit. The memory blocks store all information needed to process the data for the corresponding port or VC-4-xc.

The data path width of the framer according to the present invention is preferably chosen to be 9 bytes since 3 bytes and 9 bytes are the data path width which fit the lengths of all SDH/SONET frames from STM-1 to STM-64. However, a 3 byte data path may also be possible, requiring a higher processing speed. Having a 3 byte data path advantageously extends the range of a framer according to the present invention from STM-1/STM-64 to STS-1/STM-64 (STS-1 data rate is a third of STM-1).

A framer corresponding to the present invention may, e.g., use 64 STM-1 or 16 STM-4 input ports on its receive side implemented as serial data connection plus clock signal. The 16 STM-4 ports may be taken from the number of 64 STM-1 ports and reuse these pins. In addition there may be 4 STM-16 ports with, e.g., 8-bit parallel interfaces each plus a single 16-bit interface for STM-64. Of course, any distribution of the ports between STM-1, STM-4, and STM-16 with an aggregate data rate corresponding to STM-64 or using an STM-64 frame only is advantageously possible. The first unit after the ports would be a buffer unit for ordering data in the way that 9 bytes of data from a single port are available per system clock cycle.

One possible implementation would be that the STM-1 and STM-4 receive ports have 1:72 demultiplexers followed by a small FIFO buffer for each of the ports, the STM-16 receive ports have 8:72 demultiplexers followed by a small FIFO and the STM-64 port has a 16:72 demultiplexer followed by a small FIFO. On the framer side, the FIFOs would operate with a single clock for all ports of same data speed. A combination of ports with different data speeds is possible by either running the FIFO belonging to higher data speed ports with the corresponding multiple of the clock rate for the low-speed ports and extracting the data from these higher speed buffers accordingly more often than from the lower speed buffers or by working with a single buffer array and a single system clock on the framer side by using the place for 4 STM-1 port buffers for 1 STM-4 port buffer, 16 STM-1 port buffers for 1 STM-16 port buffer and all 64 STM-1 port buffers for the STM-64 port buffer. This embodiment however needs a larger FIFO buffer.

Another embodiment would be to use a central buffer, such as a 9×64 bytes buffer, into which data from all the ports are written with a single clock speed by first demultiplexing data from an STM-1 port by 1:8 (1 bit to 1 byte), data from an STM-4 port by 1:32 (4 byte), data from an STM-16 port by 1:128 (16 byte) and writing these data into the central buffer in such a way that 9 bytes (=72 bits) belong to one STM-1 port, 4×9=36 bytes to an STM-4 port, 16×9=144 byte to an STM-16 port. Using a STM-64 port would need the whole buffer or could directly bypass the buffer.

According to a third embodiment of the present invention, the incoming data streams are converted to a width of 1 or 2 bytes for each port. Subsequently the ports are scanned with different repetition rates for writing the data into the central buffer. This would advantageously reduce the number of register bits per port outside the central buffer.

In a fourth embodiment a frame byte-alignment unit would be provided placed before the central buffer the framer in accordance with the third embodiment described above. Accordingly, data are only written into the central buffer after the frame byte-alignment was found. The advantage here is to eliminate additional storage space otherwise needed in the frame byte-alignment unit. Such a frame byte alignment unit could work with data in 1 or 2 byte portions to further reduce total buffer storage. In all these arrangement each STM-N (N=1.64) port uses N×9 bytes of the buffer and the 9 bytes would be transferred onto the data path per clock cycle.

The next processing steps for incoming data are frame byte alignment (except for the fourth embodiment described above) and frame descrambling. Since all 9 bytes of a single clock cycle belong to the same receive port a corresponding frame byte alignment unit and frame descrambling unit are feasible in the data multiplexing mode. The next unit is formed by a section overhead processing (SOH) unit. Before the administrative unit handler (AUH) which is responsible for pointer and path overhead processing a data reordering unit is necessary as long as virtual container configurations are not restricted to the maximum possible concatenation within the corresponding STM-N frame. For an STM-64 frame one can have:
1. 1×VC-4-64c
2. 4×VC-4-16c
3. 16×VC-4-4c
4. 64×VC-4

For 64×VC-4 the 64 VC-4 have been byte interleaved in the STM-64 frame with the second byte from the first VC-4 arriving 64 bytes after the first one. In a VC-44c four bytes of payload are concatenated into a single container and the next 4 bytes of the same VC-4-4c arrive after again 64 bytes. In a VC-4-16c 16 bytes have been concatenated with the next 16 bytes from the same VC-4-16c arriving again after 64 bytes. In case of a VC-4-64c the whole payload is concatenated into a single VC-4-64c.

For an STM-16 frame one can have:
1. 1×VC-4-16c
2. 4×VC-4-4c
3. 16×VC-4

And for an STM4 frame:
1. 1×VC-44c
2. 4×VC-4

For an STM-1 there is only a single VC-4.

According to the present invention, the data are reordered so that the 9 input bytes for the AUH unit in a single clock cycle belong to the same VC-4. This requires a buffer stage of size 64×9=576 bytes and a corresponding maximum pipe line of 64 clock cycles corresponding to the 64 ports and the 9 byte data path width. (In general, if the aggregate data rate of the framer corresponds to STM-N and the data path width is m, a buffer of size m×N with a maximum pipe line of N clock cycles is required.) Such a design advantageously reduces the complexity of the respective AUH. Assuming the buffer is defined as buffer B(i, j) with i=1 . . . 9 and j=1 . . . 64 and B(1:9, j) is taken as the data forwarded to the AUH. The j-value corresponds to a specific input port with each STM-4 having 4 j-values assigned to it, each STM-16 having 16 j-values assigned to it and the STM-64 working with all j-values as described in the beginning for the port buffer array.

Since concatenation occurs in multiples of 4 bytes, there is a mismatch with the 9 byte data path width, but this can be handled within the data reordering unit. Later processing steps don't have to consider this problem. The exact algorithm for the complete data reordering depends of course on the buffer arrangement chosen at the ports, but this is known and only describes in which sequence data from different ports arrive. The important point which must be described here is the reordering of data from a single port or STM-N. For every STM-N the arrangement of data is 9 rows of data where each row starts with 9×N SOH bytes followed by 29×N STM-N payload bytes.

From the SOH bytes only the 9×N pointer bytes of the 4th row are important, every other SOH bytes have been handled with in the previous units and are not relevant for the AUH and the payload handler. With a 9 byte data path width the STM-N frame structure ensures automatically that the arriving 9 bytes per clock cycle are either SOH bytes or payload bytes. There is no mix of the two kind of data. The same would be true for a 3 byte data path width. With respect to data reordering only the 9×N pointer bytes of the 4th row and the payload bytes are important. These pointer bytes (and all the other SOH bytes) shall be stored in the corresponding buffer as if there were no concatenation independent on the concatenation of the payload bytes. The clear separation of SOH and payload bytes makes this possible. The result of this kind of storage is that the pointer bytes for each VC-4 will be forwarded to the AUH unit as

H1 Y Y H2 1*1*H3 H3 H3 with H1, H2, H3 the pointer bytes which determine the pointer value and the Y and 1* the fixed stuff bytes defined in the SDH/SONET standard. In case of concatenation only the value of the pointer for the first VC-4 is real and the values corresponding to the following concatenated VC-4s show the concatenation indication as defined in the standard.

In case of an STM-N frame there are N j-values belonging to this frame. Forming a sub-buffer B1(i, j1) with i=1:9, j1=1:N of buffer B. Without VC-4 concatenation there are N VC-4 and reordering simply writes the first 9 bytes of the STM-N frame into the first 9 j1-values for this frame with i=1. The next 9 bytes for this frame will be written into the next 9 j1-values with i switching to the next highest number whenever j1>N is reached for an i-value. After N cycles the last 9 bytes will be written into the last 9 j1-values. All N×9 bytes belonging to this STM-N frame are now stored in the N×9 buffer B1 so that B1(1:9,j1) with j1 belonging to this frame also belongs to one specific VC-4 of the N VC-4.

In case of concatenation into VC-4-xc the 4×concatenated SDH payload bytes (not SOH bytes) are written into the sub-buffer with fixed j1 and increasing i when i=9 is reached before all of the 4× bytes have been written the j1 value is increased by 1 and the i-value is switched back to 1 and writing continues for this j1 and increasing i. When all concatenated 4× bytes have been written and i is smaller than 9 the i-value is switched back to 1 and the j1-value is increased by 1 and the next 4× concatenated bytes are written into the buffer in the same way. In detail, it only must be considered x<N since complete concatenation requires no data reordering. This means there are x=4 or x=16 for STM-64 and x=4 for STM-16. The other cases are either no concatenation or complete concatenation. Somewhat more in detail with x=4 or 16 but x not larger than N, the first 9 bytes are written into:

B1(i=1: 4,j1=1) and B1(i=1:4,j1=2) and B1(i=1,j1=3) for x=4 and
B1(i=1:9,j1=1) for x=16
The second 9 bytes are written into:
B1(i=2:4, j1=3) and B1(i=1:4, j1=4) and B1(i=1:2, j1=5) for x=4 and
B1(i=1:7, j1=1)and B1(i=1:2, j1=2)for x=16

The important point here is that this is at least one clock cycle after writing the first 9 bytes into the buffer, hence B1(i=1:7, j1=1) is already free again for new data.

One important point from this data reordering and the 9 byte data path width is that the relevant 9 pointer bytes for a related VC-4 are always available within a single clock cycle to the AUH unit which handles pointer and path overhead processing. Since pointer processing is a process with a large number of logic levels after synthesis further pipe lining may ensure that it can be handled within a single clock cycle at 9.96 Gb/9=138.33 MHz.

Payload handling follows as last processing step in the receive direction. It strongly depends on the different payloads to handle. The implementation is the normal one for the corresponding application with the only difference that different memory blocks are used for different clock cycles and hence different VC-4-xc as described for the data reordering unit.

One possible alternative is that the data path width could be changed from 9 bytes to e.g. 8 bytes after the pointer processing since the advantages of the 9 bytes data path vanish after the SOH unit. Also, since the SOH bytes (except the pointer bytes) are no longer needed after the SOH unit one could decide not to store these bytes in the buffer and not to transmit them on. The data reordering however may be more complicated for this case and a new clock rate is needed if these data are not forwarded.

For the framer transmit side one starts with the payload handling followed by pointer generation and mapping the payload into VC-4xc containers. The data reordering unit now works in reverse order, thereby byte-interleaving data from different VC-4-xc in accord with the concatenation configurations. SOH processing and frame scrambling are the next units before the frames are forwarded to the different output ports.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
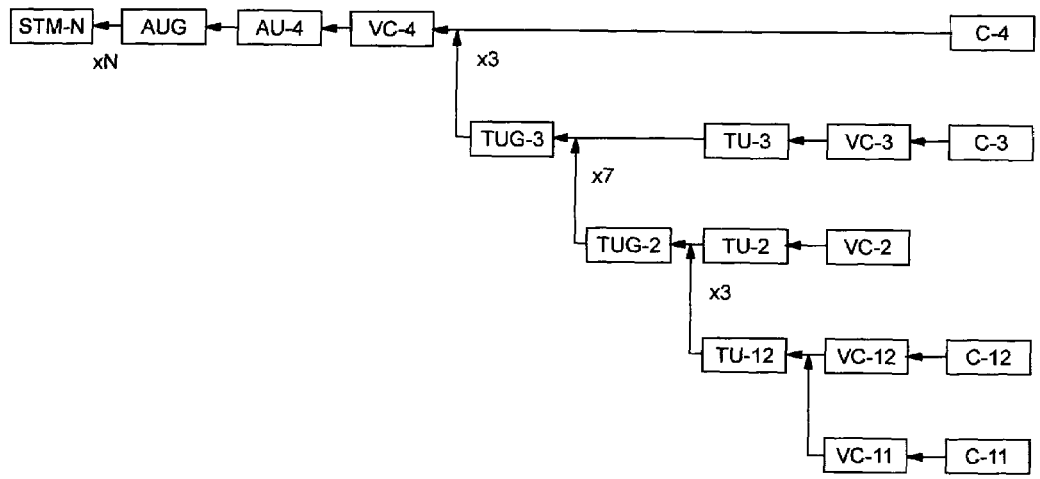
FIG. 1 shows an overview over the SDH signal hierarchy up to the STM-N signal.
Figure 2:
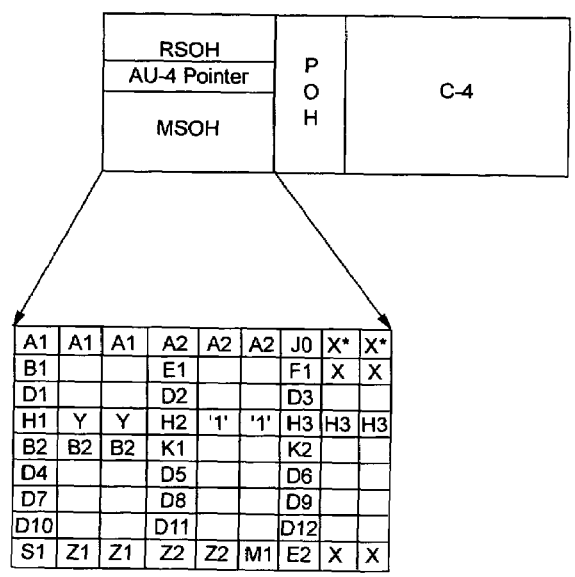
FIG. 2 shows a STM-1 signal with a VC-4 container according to standard provisions.
Figure 3:
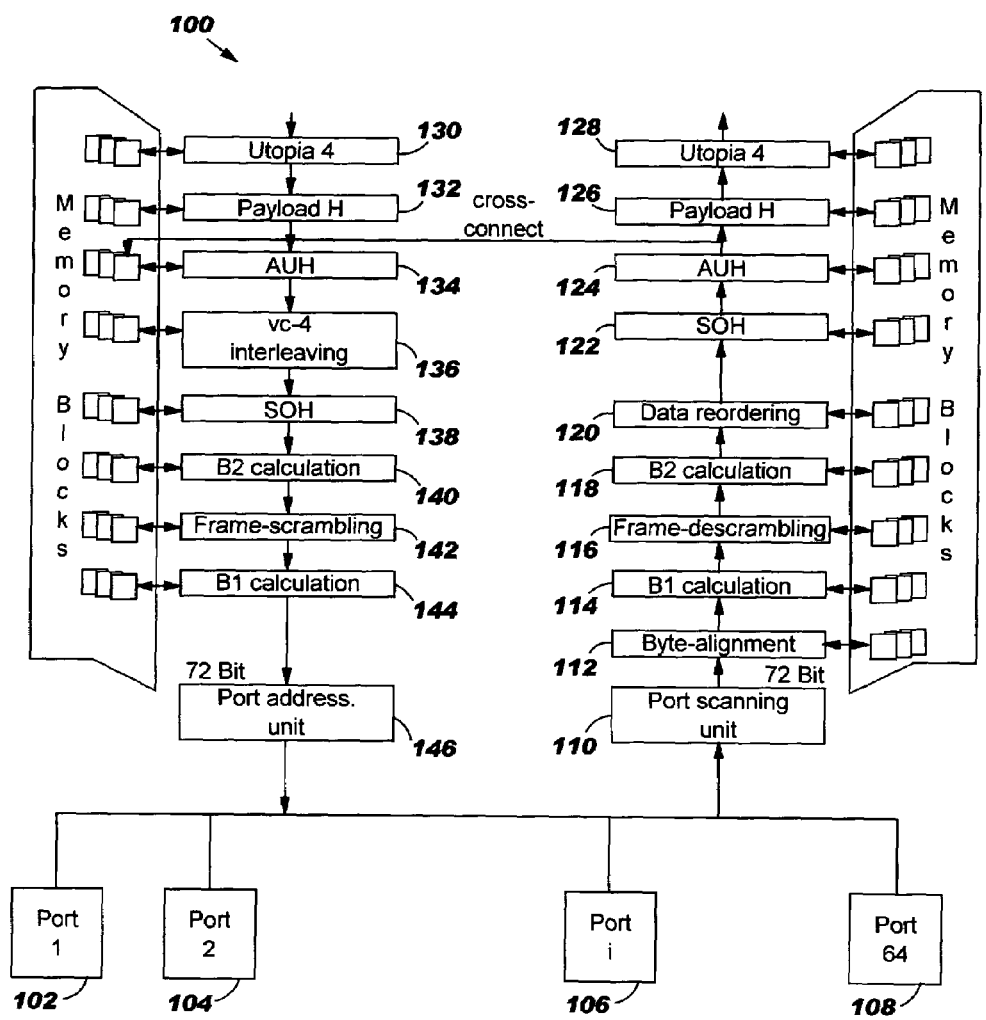
FIG. 3 shows a device for combining at least two data signals having an input data rate into a single data stream having an output data rate being higher than the input data rate for transmission on a shared medium or vice versa in form of a STM-1 to STM-64 SDH/SONET framer.

With reference to FIG. 3, there is depicted a device for combining at least two data signals having an input data rate into a single data stream having an output data rate being higher than the input data rate for transmission on a shared medium or vice versa in form of a STM-1 to STM-64 SDH/SONET framer. The STM-1 to STM-64 Framer described in the following is based on a data multiplexing or context switching architecture which allows a single framer to handle multiple STM-N frames with N={1, 4, 16, 64} up to an aggregate data rate corresponding to STM-64 (STS-192 or OC-192 in SONET notation), i.e., 9.96 Gb/s. These frames may use the corresponding sets of VC-4-xc, x={1, 4, 16, 64<=N} virtual containers. The support of VC-3-xc, x={3, 12, 48, 192} may also be possible. Since the units in the data path work on different ports/frames/VC-4s with each clock cycle, status information of the unit must be stored per frame or VC-4. There is information which must be stored per frame and unit or per VC-4 and unit and there is information which must be stored per frame or per VC-4 which is used by several units in the data path. The data path width for the STM-1 to STM-64 framer is chosen to 9 byte.

The data multiplexing architecture advantageously allows easy implementation of on-chip support for add-drop, digital cross-connect and automatic protection switching functions of SDH/SONET. If these system level functions are implemented the framer is applicable not only as CPN path termination, but also as WAN (Wide Area Network) multiplex section or digital cross-connect equipment.

FIG. 3 shows the basic architecture of the framer. Different devices can be build with this architecture depending on the positioning of the device as path termination or multiplex section device and a possible partitioning of the complete architecture into several chips. Before considering the complete architecture in detail it is briefly discussed the possible positioning and partitioning.

As to the framer positioning, there are two main possibilities to position the framer. As a pure path terminator device and as a WAN multiplex section device.

In the first positioning, the framer advantageously could be used to terminate a SDH/SONET path to operate directly with the SDH/SONET payload, such as ATM cells, IP packets or Gigabit-Ethernet frames, or it could map such payloads into SDH/SONET frames.

In the second positioning, the framer advantageously could be used for the WAN SDH/SONET multiplexing. Here, usually the larger part of the data streaming into a device also leave the device again and are forwarded to the next device. Add/drop multiplexing, digital cross-connect and automatic protection switching are highly important here. The assignment of incoming VC-ns to outgoing VC-ns is defined as the "connection pattern" which can be described by an unidirectional connection matrix CM(Vi, Vj), where Vi indicates the i-th incoming VC signal and Vj identifies the j-th outgoing VC signal. The connection matrix is configured and read via microprocessor write/read operations.

As to the framer partitioning, possible partitioning solutions are either to separate transmit and receive parts (if size is an issue) or to shift payload handling into a separate chip. Separating the payload handler from the framer allows updates to handle new kinds of payload by just offering new payload handlers without changing the framer itself. The SDH/SONET part is stable, the kind of payloads to handle may change significantly with time. Such payloads are not just ATM cells, IP packets and Gigabit-Ethernet frames, but also complete VC-4s/VC-3s.

Preferably an SPI-4 interface as defined by the Optical Internetworking Forum (OIF) or an Utopia level 4 interface as defined by the ATM Forum is used to forward complete VC-4s to a payload handler which also allows connection to DS3 mapper devices or to receive complete VC-4s from such a mapper device. The framer part without payload handler then may be implemented on a single chip which directly incorporates also the system level functions of add/drop multiplexing, digital cross-connect and automatic protection switching. Advantageously, these additions take a nearly negligible effort and silicon area. For digital cross-connect without add/drop multiplexing this part would then fit even without an additional payload handler chip.

As to the scaleability of the framer in accordance with the present invention. Firstly, there is the possibility to scale down the size of the framer by restricting its number of ports and the kind of frames it can handle and keeping the system clock at the STM-64 rate:

| SCALE | PORTS | MEMORY |
| --- | --- | --- |
| full: STM-1 to STM-64 | 64 STM-1, 16 STM-4, 4 STM-16, 1 STM-64 | 64 memory banks |
| STM-4 to STM-64 | 16 STM-4, 4 STM-16, 1 STM-64 | 16 memory banks |
| STM-16 to STM-64 | 4 STM-16, 1 STM-64 | 4 memory banks |
| lowest: STM-64 only | 1 STM-64 | 1 memory bank |

Secondly, there is a scaling possibility by running the framer with a lower system clock rate than that corresponding to STM-64 (OC-192). Hence, one can choose a system clock rate corresponding to STM-16 (OC-48), STM4 (OC-12) or even STM-1:

| SCALE | SYSTEM CLOCK | PORTS | MEMORY |
| --- | --- | --- | --- |
| Full: STM-1 to STM-64 | STM-64 | 64 STM-1, 16 STM-4, 4 STM-16, 1 STM-64 | 64 memory banks |
| STM-1 to STM-16 | STM-16 | 16 STM-1, 4 STM-4, 1 STM-16 | 16 memory banks |
| STM-1 to STM-4 | STM-4 | 4 STM-1, 1 STM-4 | 4 memory banks |
| lowest: STM-1 only | STM-1 | 1 STM-1 | 1 memory bank |

Both scalability options together lead to about 10 different framers with the present architecture but different number of line ports and different requirements for on-chip memory:
- an STM-1 to STM-64 framer
- an STM-4 to STM-64 framer
- an STM-16 to STM-64 framer
- an STM-64 only framer
- an STM-1 to STM-16 framer
- an STM-4 to STM-16 framer
- an STM-16 only framer
- an STM-1 to STM-4 framer
- an STM-4 only framer
- an STM-1 only framer As to the reference clocks, a SDH/SONET framer needs at least one reference clock according to the SDH/SONET standards. The present framer also needs a system clock on its receive side which must be somewhat faster than the corresponding reference clock for STM-64 (or STM-16, STM-4, STM-1 in case of reduced system clocks as mentioned in the section on scalability) to ensure that all line port FIFOs are read often enough to not overlook any update. Considering the line ports, the framer receives the following reference clocks on its receive side:
- STM-1 ports: 155.52 MHz (from electro/optical modules with clock/data recovery)
- STM-4 ports: 622.08 MHz (from electro/optical modules with clock/data recovery)
- STM-16 ports: 3 11.04 MHz (from the 8-bit SERDES with clock/data recovery)
- STM-64 ports: 3 11.04 or 622.08 MHz (configurable, from the 16-bit interface)

These are also standard SDH/SONET reference clocks. For STM-64 clock rate and 9-byte data path a system clock faster than 138.24 MHz is needed. The easiest way to derive such a clock from the usual reference clocks is to use a 155.52 MHz clock recovered either directly from a STM-1 line port or created from the clock at a STM-4, STM-16 or STM-64 line port, or provided externally as a 155.52 reference clock. This clock is then 11% faster than necessary. However, there will be cycles without valid data to operate on in any case. By designing the system in a way that no unit performs any action (except checking for the data valid bit) if the data is marked as invalid (no data update since the last FIFO read), the additional power consumption due to the 11% faster system clock should be very small. Therefore, using the 155.52 MHz clock as system clock on the receive side seems the best solution.

In the following the general architecture is described. The receive side of the device as shown in FIG. 3 consists of 64 serial STM-1 line port interfaces 102 to 108, 64 9-byte/2-word FIFOs (FIG. 4), a port scanning unit 110, a byte-alignment unit 112, a B1 calculation unit 114, a frame descrambling unit 116, a B2 calculation unit 118, a data reordering unit 120, a section overhead handler 122, an administrative unit handler 124, a payload handler unit 126 and an utopia level 4 interface 128. A memory comprising of several memory elements are operatively coupled to each of the units. The memory stores information extracted from a data stream by the unit to which said memory is connected. A data bus and an address bus operatively couples the units in the Receive Path and Transmit Path, respectively. In FIG. 3 only the data bus is shown. The address bus is omitted in order to simplify the presentation.

The 64 serial STM-1 line ports 102 to 108 with corresponding clock inputs may be reusable also as 16 serial STM-4 line port interfaces, plus 4 8-bit STM-16 interfaces, plus 1 16-bit STM-64 interface according to the OIF-99-102 standard document. Each port 102 to 108 contains a multiplexer which multiplexes the data onto a data path width of 9 bytes. Considering the 2 byte STM-64 interface and the multiplexing to 9 byte one must consider that the next unit is a FIFO with 2 9-byte words and that 2×9=18 bytes is of course again an integer multiple of the 2-bytes starting point.

If there is a loss of signal (LOS) determined by a port 102 to 108, a microprocessor interrupt is generated. If the LOS is determined within two frames, an alarm indication signal (AIS) is generated causing the SOH and AUH units to handle the received SDH/SONET signal as a logical all-ones signal. The AIS is removed within 2 frames upon termination of the LOS failure condition.

The 64 9-byte/2-word FIFOs (FIG. 4) are used to buffer the incoming data from the STM-N lines.

Figure 4:
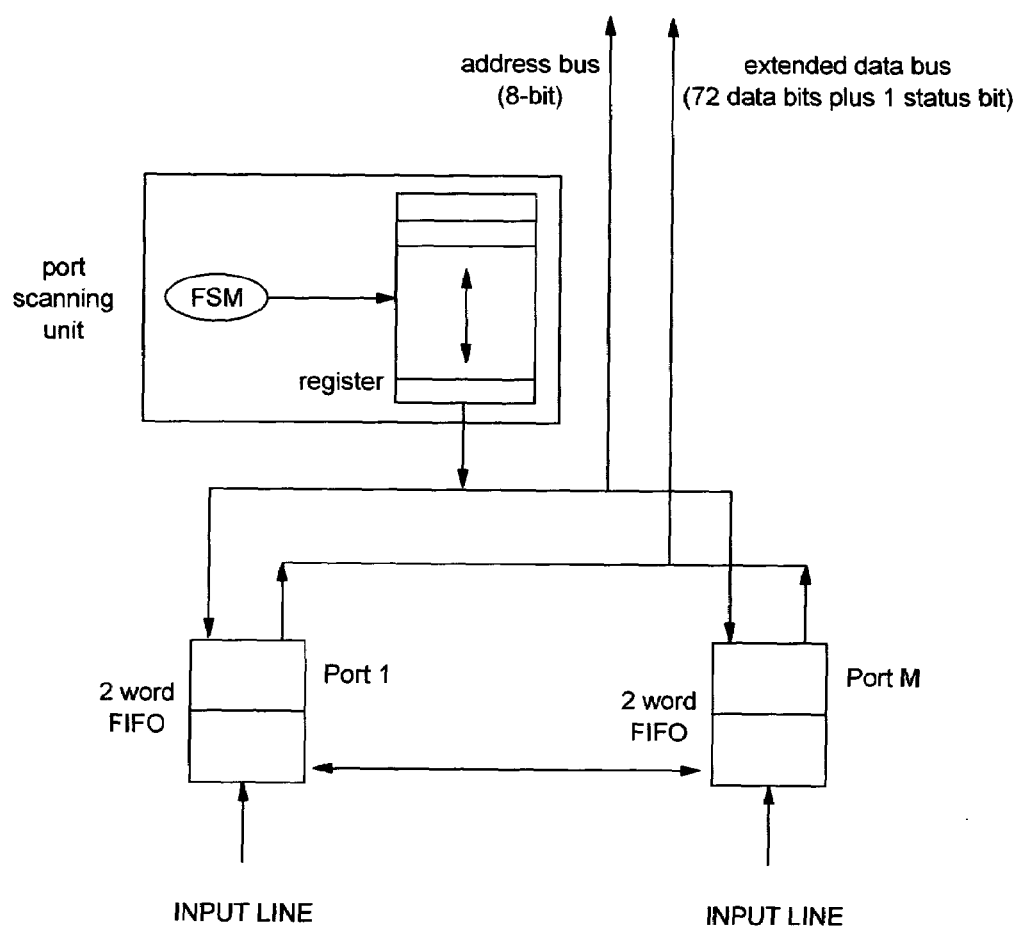
FIG. 4 shows a block diagram of the Port Scanning Unit coupled by address Bus and data bus to Port FIFO Registers.

Turning to FIG. 4 for the moment a block diagram of the Port Scanning Unit and ports are shown. The Port Scanning Unit includes a Finite STATE Machine (FSM) operatively coupled to a multiple location register A. Each port is identified by a port address which is loaded in one of the locations of the multiple location registers. Each port is provided with a port FIFO register in which data received from associated input lines is stored. Each port FIFO is coupled to a data bus. Likewise, the output from the multiple address register is coupled to an address bus which is coupled to all the port FIPOs. In one embodiment of the invention the number of addresses (positions) in the multiple location register is identical to the number of ports. Likewise, the address bus is 72 bits and 1 status bit. Similarly, the port FIFO register includes two (2) words.

Still referring to FIG. 4, the Finite State Machine (FSM) in the port scanning unit simply outputs the content of one register onto the 8-bit on-chip address bus every clock cycle. As stated herein the contents of each register position is a Port Identification Number. To achieve this it simply reads the register addresses 1 to 64 in a round robin fashion. The sequence of port addresses inside the register determines directly the sequence of port addresses sent onto the address bus. The 2-word (72 bits each) receive FIFO in each port is read whenever the port address of the FIFO equals the address on the address bus. This means that the first word of the FIFO is written onto the data bus. If the address does not equal the port address of the FIFO the device driver which puts 1 word from the FIFO onto the data bus is disabled. Therefore only the data from the selected port are sent onto the data bus. Together with the data, the 1-bit FIFO full signal is sent onto the extended data bus. The FIFO full signal is "1" when data is available. After reading 1 word from the FIFO, this signals is set to "0". It returns to "1" when new data is written into the FIFO from the SDH/SONET line port. Hence, the FIFO full signal identifies data which must be processed if it is "1" and data which should not be processed (because the data has already been processed with the last read from this FIFO) if it is "0".

Each following unit in the receive data path will connect the logical unit to a series of memory units identified by the port address on the address bus. It will operate on the data whenever the status bit on the extended data bus is found to be "1". Otherwise it will do nothing in this clock cycle. This status bit together with the fact that the system clock for the whole receive data path is faster than the sum of all line ports ensures that there never is a data update in the port FIFO which is not read and that reading a FIFO without a data update to this FIFO since the last read operation does not lead to processing the same data twice.

The port scanning unit 110 reads in a configurable manner, e.g., round robin in case all ports are equal, with a single system clock the data from the FIFOs onto the receive data path. The system clock must be at least as fast as the fastest line input clock including the clock rate variations allowed according to the SDH/SONET standards. The port scanning unit 110 sets a mark, if a FIFO buffer was read without an input data update. In this case no unit in the data path will operate on this data word.

The byte-alignment unit 112 aligns the incoming 72-bit data so that its output corresponds correctly to 9-bytes in their SDH/SONET frame position. This alignment happens by searching for the A1/A2 byte alignment pattern in hunt mode, and by continuously checking the repetition of the A1/A2 byte alignment pattern in sync mode. If the pattern is not found for m consecutive frames, e.g., m=5, the unit returns from sync to hunt mode and an out of frame (OOF) error is asserted. If the OOF condition persists for a configurable instant of time $T_{OOF}$, a LOF state is declared and a corresponding microprocessor interrupt is generated. Once in the LOF state, this state shall be left when the in-frame condition persists continuously for an instant of time $T_{LOF}$. If the LOF state is determined within two frames, an alarm indication signal (AIS) is generated causing the SOH and AUH units to treat the received SDH/SONET signal as a logical all-ones signal. The AIS is removed within 2 frames upon termination of the LOF failure condition. Only the value of the so-called alignment-position, (1<=alignment-position<=71), the status (hunt, pre-sync, sync), the number of correctly found A1/A2 pattern (in pre-sync mode), and the number of not correctly found A1/A2 patterns (in sync mode) needs to be stored per frame.

The B1 calculation unit 114 calculates the B1 parity byte (even parity) over the complete STM-N frame before the frame is descrambled. The actual B1 byte is stored in memory per frame. The final value for a complete frame is stored in a way that it later can be used by the section overhead handler (SOH) unit 122.

The frame descrambling unit 116 descrambles all incoming frame bytes except the SOH bytes of the first row of the frame which are unscambled. The unit needs the following values per STM-N frame: N, 3*N, 9*N and 2430*N.

In one embodiment of the invention the descrambling unit is similar to the frame scrambling unit in the transmit path and one implemented in VHDL code. The important difference in the implementation of this unit to a standard unit for frame scrambling is that it connects to different memory units depending on the port address provided on the address bus. The standard frame scrambling unit stores all variables locally without a need to connect to different memory units. The unit in this implementation needs to store certain variables in special memory units and it must write the information belonging to the port processed in the last clock cycle at the beginning of the new clock cycle into the corresponding memory. It must then copy the stored information corresponding to the present port address from the corresponding memory into the local variables. Only as the next step the unit can process the data. It will write the updated data to the corresponding memory units at the beginning of the following clock cycle. The following VHDL code shows this:

```
ENTITY vFrameScrambler IS
    PORT
        (                    -- Start of Port List
        Data_in       : in STD_LOGIC_VECTOR(0 to 71) ;
        Data_out      : out STD_LOGIC_VECTOR(0 to 71) ;
        SoF_in        : in STD_LOGIC ;
        SoF_out       : out STD_LOGIC ;
        ADDR_in       : in STD_LOGIC_VECTOR(0 to 5);
        GRA_in        : in STD_LOGIC_VECTOR(0 to 60);
        GRA_out       : out STD_LOGIC_VECTOR(0 to 60);
        GRA2_in       : in STD_LOGIC_VECTOR(0 to 71);
        GRA2_out      : out STD_LOGIC_VECTOR(0 to 71);
        ADDR_out      : out STD_LOGIC_VECTOR(0 to 5);
        Clk_in        : in STD_LOGIC
        );                   -- End of Port List
    ARCHITECTURE Behavior OF vFrameScrambler IS
BEGIN -- Behavior
p1: process
        -- LOCAL variables:
        variable g0    : STD_LOGIC_VECTOR(0 to 71) := tconv("FE041851E459D4FA1C", hex);
        variable gn    : STD_LOGIC_VECTOR(0 to 71);
        VARIABLE scramble_flag : integer range 0 to 1 := 1; -- 0 deactivates
                                                             -- frame descrambling
        variable ADDRESS : STD_LOGIC_VECTOR(0 to 5);
        -- ALL variables defined after this line must be stored per frame:
        variable g     : STD_LOGIC_VECTOR(0 to 71);
        VARIABLE byte_cnt : integer range 0 to 155530 := 0;
        -- Variables which determine the SDH frame
        --------------+------+------+-------+--------
        -- stm_n | 1 | 4 | 16 | 64
        -- stm_n_3 | 3 | 12 | 48 | 192
        -- stm_n_9 | 9 | 36 | 144 | 567
        -- stm_n_2430 | 2430 | 9720 | 38880 | 155520
        VARIABLE stm_n : integer range 1 to 64 := 64;
        variable stm_n_3 : integer range 3 to 192 := 192;
        variable stm_n_9 : integer range 9 to 576 := 576;
        variable stm_n_2430 : integer range 2430 to 155520 := 155520;
    BEGIN -- process p1
        WAIT on clk_in until clk_in='1';
        -- update status information to GRA
```

```
ADDR_out <= ADDRESS;
GRA_out(0 to 6) <= CONV_STD_LOGIC_VECTOR(stm_n,7);
GRA_out(7 to 14) <= CONV_STD_LOGIC_VECTOR(stm_n_3,8);
GRA_out(15 to 24) <= CONV_STD_LOGIC_VECTOR(stm_n_9,10);
GRA_out(25 to 42) <= CONV_STD_LOGIC_VECTOR(stm_n_2430,18);
GRA_out(43 to 60) <= CONV_STD_LOGIC_VECTOR(byte_cnt,18);
GRA2_out(0 to 71) <= g;
-- read status information from GRA
ADDRESS := ADDR_in;
stm_n := CONV_INTEGER(tconv(GRA_in(0 to 6)));
stm_n_3 := CONV_INTEGER(tconv(GRA_in(7 to 14)));
stm_n_9 := CONV_INTEGER(tconv(GRA_in(15 to 24)));
stm_n_2430 := CONV_INTEGER(tconv(GRA_in(25 to 42)));
byte_cnt := CONV_INTEGER(tconv(GRA_in(43 to 60)));
g := GRA2_in(0 to 71);
    g0 := tconv("FE041851E459D4FA1C", hex);
    gn(0) := g(2) xor g(3) xor g(5) xor g(6);
    gn(1) := g(3) xor g(4) xor g(6) xor g(7);
    gn(2) := g(1) xor g(2) xor g(4) xor g(5) xor g(7);
    gn(3) := g(1) xor g(3) xor g(5) xor g(6);
    gn(4) := g(2) xor g(4) xor g(6) xor g(7);
    gn(5) := g(1) xor g(2) xor g(3) xor g(5) xor g(7);
    gn(6) := g(1) xor g(3) xor g(4) xor g(6);
    gn(7) := g(2) xor g(4) xor g(5) xor g(7);
-- --------------------------------------------------------
    gn(8) := g(10) xor g(11) xor g(13) xor g(14);
    gn(9) := g(11) xor g(12) xor g(14) xor g(15);
    gn(10) := g(9) xor g(10) xor g(12) xor g(13) xor g(15);
    gn(11) := g(9) xor g(11) xor g(13) xor g(14);
    gn(12) := g(10) xor g(12) xor g(14) xor g(15);
    gn(13) := g(9) xor g(10) xor g(11) xor g(13) xor g(15);
    gn(14) := g(9) xor g(11) xor g(12) xor g(14);
    gn(15) := g(10) xor g(12) xor g(13) xor g(15);
-- --------------------------------------------------------
    gn(16) := g(18) xor g(19) xor g(21) xor g(22);
    gn(17) := g(19) xor g(20) xor g(22) xor g(23);
    gn(18) := g(17) xor g(18) xor g(20) xor g(21) xor g(23);
    gn(19) := g(17) xor g(19) xor g(21) xor g(22);
    gn(20) := g(18) xor g(20) xor g(22) xor g(23);
    gn(21) := g(17) xor g(18) xor g(19) xor g(21) xor g(23);
    gn(22) := g(17) xor g(19) xor g(20) xor g(22);
    gn(23) := g(18) xor g(20) xor g(21) xor g(23);
-- --------------------------------------------------------
    gn(24) := g(26) xor g(27) xor g(29) xor g(30);
    gn(25) := g(27) xor g(28) xor g(30) xor g(31);
    gn(26) := g(25) xor g(26) xor g(28) xor g(29) xor g(31);
    gn(27) := g(25) xor g(27) xor g(29) xor g(30);
    gn(28) := g(26) xor g(28) xor g(30) xor g(31);
    gn(29) := g(25) xor g(26) xor g(27) xor g(29) xor g(31);
    gn(30) := g(25) xor g(27) xor g(28) xor g(30);
    gn(31) := g(26) xor g(28) xor g(29) xor g(31);
-- --------------------------------------------------------
    gn(32) := g(34) xor g(35) xor g(37) xor g(38);
    gn(33) := g(35) xor g(36) xor g(38) xor g(39);
    gn(34) := g(33) xor g(34) xor g(36) xor g(37) xor g(39);
    gn(35) := g(33) xor g(35) xor g(37) xor g(38);
    gn(36) := g(34) xor g(36) xor g(38) xor g(39);
    gn(37) := g(33) xor g(34) xor g(35) xor g(37) xor g(39);
    gn(38) := g(33) xor g(35) xor g(36) xor g(38);
    gn(39) := g(34) xor g(36) xor g(37) xor g(39);
-- --------------------------------------------------------
    gn(40) := g(42) xor g(43) xor g(45) xor g(46);
    gn(41) := g(43) xor g(44) xor g(46) xor g(47);
    gn(42) := g(41) xor g(42) xor g(44) xor g(45) xor g(47);
    gn(43) := g(41) xor g(43) xor g(45) xor g(46);
    gn(44) := g(42) xor g(44) xor g(46) xor g(47);
    gn(45) := g(41) xor g(42) xor g(43) xor g(45) xor g(47);
    gn(46) := g(41) xor g(43) xor g(44) xor g(46);
    gn(47) := g(42) xor g(44) xor g(45) xor g(47);
-- --------------------------------------------------------
    gn(48) := g(50) xor g(51) xor g(53) xor g(54);
    gn(49) := g(51) xor g(52) xor g(54) xor g(55);
    gn(50) := g(49) xor g(50) xor g(52) xor g(53) xor g(55);
    gn(51) := g(49) xor g(51) xor g(53) xor g(54);
    gn(52) := g(50) xor g(52) xor g(54) xor g(55);
    gn(53) := g(49) xor g(50) xor g(51) xor g(53) xor g(55);
    gn(54) := g(49) xor g(51) xor g(52) xor g(54);
    gn(55) := g(50) xor g(52) xor g(53) xor g(55);
-- --------------------------------------------------------
```

```
        gn(56) := g(58) xor g(59) xor g(61) xor g(62);
        gn(57) := g(59) xor g(60) xor g(62) xor g(63);
        gn(58) := g(57) xor g(58) xor g(60) xor g(61) xor g(63);
        gn(59) := g(57) xor g(59) xor g(61) xor g(62);
        gn(60) := g(58) xor g(60) xor g(62) xor g(63);
        gn(61) := g(57) xor g(58) xor g(59) xor g(61) xor g(63);
        gn(62) := g(57) xor g(59) xor g(60) xor g(62);
        gn(63) := g(58) xor g(60) xor g(61) xor g(63);
-- ------------------------------------------------------------
        gn(64) := g(66) xor g(67) xor g(69) xor g(70);
        gn(65) := g(67) xor g(68) xor g(70) xor g(71);
        gn(66) := g(65) xor g(66) xor g(68) xor g(69) xor g(71);
        gn(67) := g(65) xor g(67) xor g(69) xor g(70);
        gn(68) := g(66) xor g(68) xor g(70) xor g(71);
        gn(69) := g(65) xor g(66) xor g(67) xor g(69) xor g(71);
        gn(70) := g(65) xor g(67) xor g(68) xor g(70);
        gn(71) := g(66) xor g(68) xor g(69) xor g(71);
IF( SoF_in = '1') THEN
    byte_cnt := stm_n_3 - 2;   -- stm_n_3 - 3 + 1, the -3 comes from
                                                        -- the byte-alignment unit
        END IF;
        IF ( byte_cnt > 0 ) THEN
            byte_cnt := byte_cnt + 9; -- increase the byte_cnt by the data
                                                        -- path width every cycle
        END If;
        if ( byte_cnt = stm_n_2430 + 10) then
                byte_cnt := 10;                 -- 2430 * stm_n means end of frame
        end if;
        if ( byte_cnt > stm_n_9 + 1) then
            g := gn;
        else
            g := g0;
        END IF;
        IF ( byte_cnt > stm_n_9 AND byte_cnt <= stm_n_2430 AND scramble_flag = 1 ) THEN
            Data_out <= Data_in(0 to 71) xor g(0 to 71);
        ELSE
            Data_out <= Data_in;
        END IF;
        SoF_out <= SoF_in;
    END PROCESS ;
END Behavior ;
```

In this example, GRA and GRA2 are memory registers needed to store variables from this unit per port. The fact that two register blocks were used is caused by the size of the data and has nothing to do with different memory units as discussed before. The assignment of the registers to specific memory units according to the valid port address is done outside this logical unit. The important point is that the hardware description code shown above defines "local variables" which are not stored in specific memory each clock cycle but which will simply be overwritten by data from a new port in the next clock cycle, as well as "variables which must be stored per frame" and hence per port. Another important point are the variables stm_n, stm_n_3, stm_n_9 and stm_n_2430. These are variables stored per port address and they determine the frame type, i.e. N in the STM-N. In principle stm_n would be sufficient since all other values are just multiples of this value, however all the values must be stored in memory since synthesizing a chip design can not be done with numbers which still must be calculated. stm_n could be skipped since it is not really needed in this unit. stm_n_9=9*stm_n determines the number of bytes in a row which are section overhead bytes, all following bytes are payload bytes. stm_n_2430 determines the number of bytes in a single row and therefore the end of one row and the start of the next row of an STM-N frame. stm_n_3 is needed for aligning the data correctly with the frame.

All the other units in the data path need some of these numbers stm_n, stm_n_3, stm_n_9 or stm_n_2430 exactly in the same way as shown above and they also need to store data into port specific memory at the beginning of a clock cycle and to copy data from port specific memory into local variables before processing the data on the data bus exactly in the same way as in the above example.

The B2 calculation unit 118 calculates the 3*N B2 bytes of the STM-N frame as BIP-N×24 even parity over the complete frame except the SOH bytes of the first 3 rows after frame descrambling.

The data reordering unit 120 reorders each incoming row of an STM-N frame so that the byte-interleaving of the N STM-1 sub-frames is removed and the 9 byte output corresponds to 9 consecutive bytes of a single STM-1 sub-frame in case of SOH bytes and 9 consecutive bytes of a single VC-4-xc in case of SDH/SONET payload bytes. The H3 pointer bytes are reordered in a way compatible with the payload bytes not the SOH bytes. This unit needs a 2×64×9 bytes buffer for operation.

The section overhead handler (SOH) unit 122 retrieves all relevant SOH bytes out of the incoming data and stores these bytes per frame in memory. Each SOH byte is read/write accessible by the microprocessor. A word-mask is set which distinguishes the data bytes from the SOH bytes for the following units in the receive data path. This mask is forwarded with the data on the data path. In case that all the 9 bytes are SOH bytes, the mask is "00", in case, the first 6 bytes are SOH bytes and the last 3 bytes are data bytes (H3 bytes and pointer decrement), the mask is "01", in case, the first 3 bytes are SOH bytes and the last 6 bytes are data bytes (pointer increment), the mask is "10", in case of pure 9 byte data the mask is "11". No further SOH/data byte pattern occurs. This unit handles regenerator section overhead (RSOH) bytes and multiplex section overhead (MSOH) bytes.

The administrative unit handler (AUH) unit 124 retrieves all path overhead (POH) bytes from the incoming data and stores these bytes per VC-4 in memory. Each POH byte is read/write accessible by the microprocessor. For finding the POH bytes in the incoming data, the pointer value of the AU-4, evaluated by the SOH unit and stored in memory, is used in connection with a corresponding byte counter and the masking pattern provided with the incoming data on the data bus. Depending on configuration, the AUH unit will forward either the complete VC-4 (including POH bytes) or only the C-4 payload bytes into a FIFO from which the payload handler then reads the data for further processing. The first case is used for VC-4 forwarding to DS3 mapper devices through the Utopia level 4 interface. The second case is used for path termination through ATM, PPP, or other payload handler units. If the framer is positioned as a multiplex section device with add/drop multiplexing and digital cross-connect, there will be a further configuration, in which the AUH unit writes the VC-4 into the corresponding FIFO on the transmit side. Thereby facilitating the loop back which allows implementation of the system level functions going beyond a path terminator device.

The payload handler unit 126 forwards the payload as ATM cells or PPP packets into a configurable shared-buffer FIFO (up to 64 ports) from which the Utopia level 4 interface reads the data after performing the necessary cell/packet delineation and data consistency checks.

The Utopia level 4 interface 128 is provided for transmitting data to a link layer device or to DS3 mapper devices.

The transmit side consists of an Utopia level 4 interface 130, a payload handler unit 132, an administrative unit handler 134, a VC-4 interleaving unit 136, a section overhead handler unit 138, a B2 calculation unit 140, a frame-scrambling unit 142, a B1 calculation unit 144 and a port address unit 146.

The Utopia level 4 interface 130 receives data from a link layer device or from DS-3 mapper devices which writes the data into a configurable shared-buffer FIFO (up to 64 ports) from which the payload handler unit reads the data.

The payload handler unit 132 which maps ATM cells and PPP packets into the necessary formats for the VC-4 containers.

The administrative unit handler (AUH) unit 134 creates the path overhead bytes per VC-4 and maps the payload (ATM cell or PPP packet stream) into the VC-4s. In path termination device mode no pointer generation function is needed and the corresponding AU-4 pointer value will be set to zero. For a multiplex section device with add/drop multiplexing and digital cross-connect functions several possibilities exist.

Firstly, through-timing, in this mode the transmit clock on the SDH/SONET line port is taken from the receive clock of the corresponding input line port, hence input and output clock are identical and no pointer processing is needed. However, since there are several input ports with different reference clocks the system clock on the transmit side will be chosen identical to that on the receive side and corresponding to the use of empty clock cycles if an input port FIFO was not updated between two read operations from the input port, empty clock cycles must be included on the transmit side if the buffer fill level on the transmit side falls below a certain mark. Since receive and transmit reference clocks are identical the units with the somewhat higher system clock between the input and output ports acts just as a speedup in between. The size of the output FIFO buffer needed for smooth operation must still be calculated.

Secondly, line-timing, in this mode one of the receive reference clocks is chosen as reference clock for all of the transmit output lines. This clock is then also chosen as system clock on the transmit side. Pointer generation is then necessary to account for the clock rate differences between the various receive reference clocks and the chosen transmit reference clock.

Thirdly, external transmit timing, in this mode an externally provided reference clock is used as transmit clock. The situation is the same as described for line-timing.

The VC-4 interleaving unit 136 performs byte-interleaving of the various VC-4s belonging to a single STM-N frame. This unit will need a 2×64×9 byte buffer and for the SDH/SONET payload bytes performs the inverse operation to the data reordering unit in the receive path.

The section overhead handler (SOH) unit 138 creates the SOH bytes for each of the STM-N frames. The B2 calculation unit 140 calculates the 3*N B2 bytes of an STM-N frame as BIP-N×24 even parity over the complete frame except the SOH bytes of the first 3 rows before frame scrambling. The unit stores the actual B2 values in memory per frame and the final B2 values for including into the B2 bytes of the next frame for the same port by the SOH unit.

The frame-scrambling unit 142 which is identical to the frame descrambling unit in the receive path scrambles all frame bytes except the SOH bytes of the first row of the frame which are left unscambled. The unit needs the following values per STM-N frame: N, 3*N, 9*N and 2430*N.

The B1 calculation unit 144 which calculates the B1 parity byte (even parity) over the complete STM-N frame after frame-scrambling. The actual B1 byte is stored in memory per frame. The final value for a complete frame is stored in a way that it later can be used by the section overhead handler (SOH) unit.

The port address unit 146 forwards on the data bus the data from each frame and on the address bus the port address to the corresponding FIFO at the output ports. If the address on the address bus is identical to the port address the corresponding FIFO receives the data. All other FIFOs will not receive the data. Preferably, FIFOs are read on the line port side according to their line port clock. The forwarding schedule is configurable. In case that all ports are equal (64 STM-1, 16 STM-4, or 4 STM-16) the schedule will be a simple round robin. Writing into the output port FIFOs is done with the system clock, reading out of the port FIFOs is done with the specific line clock.

According to another embodiment of the present invention, a STM-4 to STM-256 framer may be realized. In this case a 9-byte wide data path may not be desired because of constrains of present technology, a 18- or 36-byte data path width may be used instead. The embodiment would be identical to the one described above except the details related to the 9-byte data path width.

The invention claimed is:

1. A device (100) for combining at least two data signals having an input data rate into a single data stream having an output data rate being higher than the input data rate for transmission on a shared medium or vice versa, said device comprising at least two ports (102 to 108)) for receiving said at least two data signals, a port scanning unit (110) for extracting data from the data signals received by said ports, characterized in that said port scanning unit (110) is configured to extract data from ports providing data streams having at least two different input data rates, a control logic unit functionally connected to said port scanning unit (110) for determining which of said at least two ports need to be handled within which clock cycle with regard to its input data rate, a central buffer connected to said port scanning unit (110) into which data from all ports are written, wherein the control logic unit is configured to control said port scanning unit (110) to read per access from all ports the same amount of data and writing the data from a port having a higher input data rate proportionally more often into said central buffer than from a port having a lower input data rate, and a byte alignment unit functionally connected to the central buffer to ensure that only frame byte aligned data are written into said central buffer.

2. A method for combining at least two data signals having an input data rate into a single data stream having an output data rate being higher than the input data rate for transmission on a shared medium or vice versa, said method comprising the steps of:

receiving said at least two data signals, extracting data from the data signals received by said ports, characterized by the step of extracting data from ports providing data streams having at least two different input data rates, determining which of said at least two ports need to be handled within which clock cycle with regard to its input data rate, writing data from all ports are written in a central buffer, reading per access from all ports the same amount of data and writing the data from a port having a higher input data rate proportionally more often into said central buffer than from a port having a lower input data rate, and performing a byte alignment to ensure that only frame byte aligned data are written into said central buffer.

3. A method comprising the acts of:

(a) receiving, in ports of a network device, frames in which at least two data traffic with different transmission rates are encoded;

(b) reading frames from the ports into a receiving path with a port scanning unit;

(c) examining the frames with a plurality of processing units operatively disposed within the receive path;

(d) as each processing unit, in the plurality of processing units, examines the frames extracting data encoded in particular section of said frame and forwarding remaining portion of the frame to downstream processing units;

(e) repeating step (d) by downstream processing units until the payload section of the frame remains;

(f) receiving the payload section of the frame in a payload handling unit which parses the content into specific data types based upon the encoded data.

4. The method of claim 3 further including the act of receiving the specific data type in a Utopia level 4 interface which transmits the specific data type to a link layer device or $DS_3$ mapper device.

5. The method of claim 3 wherein the extracted data is stored in memory units.

6. A device comprising:

a data scanning unit that accesses ports of a network device to read data frames in which a payload of at least two data traffic at different rates are encoded;

a plurality of storage elements that store information extracted from the data frames;

a plurality of Receive processing units operatively coupled in series, wherein each one of the plurality of processing units is coupled to selected ones of the storage elements and said each one of the plurality of processing units examining the frame and extracting information from predetermined portion of said frame and forwarding the remaining portion of said frame to downstream processing units; and a payload handler receiving the payload in said frame and parsing the payload to generate different data types embedded in said payload.

7. The device of claim 6 further including a plurality of transmit processing units operatively coupled in series and cooperating to generate and transmit to said ports a frame containing a payload of at least two data traffic at different rates.

8. The device of claim 7 further including a plurality of memories selectively coupled to selected ones of the plurality of transmit processing units.

* * * * *